Nov. 10, 1925.  
C. S. BARRELL  
1,560,525  
TENSIONING DEVICE FOR TIRE CHAINS  
Filed March 25, 1921

Inventor:
Charles S. Barrell
by Robt. P. Harris
Attorney

Patented Nov. 10, 1925.

1,560,525

UNITED STATES PATENT OFFICE.

CHARLES S. BARRELL, OF BOSTON, MASSACHUSETTS.

TENSIONING DEVICE FOR TIRE CHAINS.

Application filed March 25, 1921. Serial No. 455,608.

*To all whom it may concern:*

Be it known that I, CHARLES S. BARRELL, a citizen of the United States, residing at Boston, in the county of Suffolk and State of Massachusetts, have invented an Improvement in a Tensioning Device for Tire Chains, of which the following description, in connection with the accompanying drawings, is a specification, like characters on the drawings representing like parts.

The invention to be hereinafter described relates to tensioning devices for tire chains and more particularly to means for holding the same snugly to the tire.

The tire chain commonly in use, comprises circular side chains and short cross chains having their terminals connected to the circular side chains. When the tire chain is applied to a tire, the circular side chains are located at opposed sides of a tire, and the cross chains extend transversely of the tread of the tire.

These cross chains are liable to flop about with objectionable noise, and if the circular side chains are tensioned sufficiently to prevent such action of the cross chains, the latter are drawn so tightly to the tread of the tire that the wear on the tire is objectionably localized.

Devices have been designed which are intended to hold the cross chains snugly to the tread of the tire, but they have been found unsatisfactory, and in practice do not serve to hold all of the cross chains properly snugly to the tire.

The purpose of the present invention, therefore, is to provide a cheap, simple, efficient means for holding all the cross chains snugly to the tire, but without sufficient tightness to prevent rolling of the cross chains and creep of the tire chain as a whole circumferentially of the tire.

Figure 1:
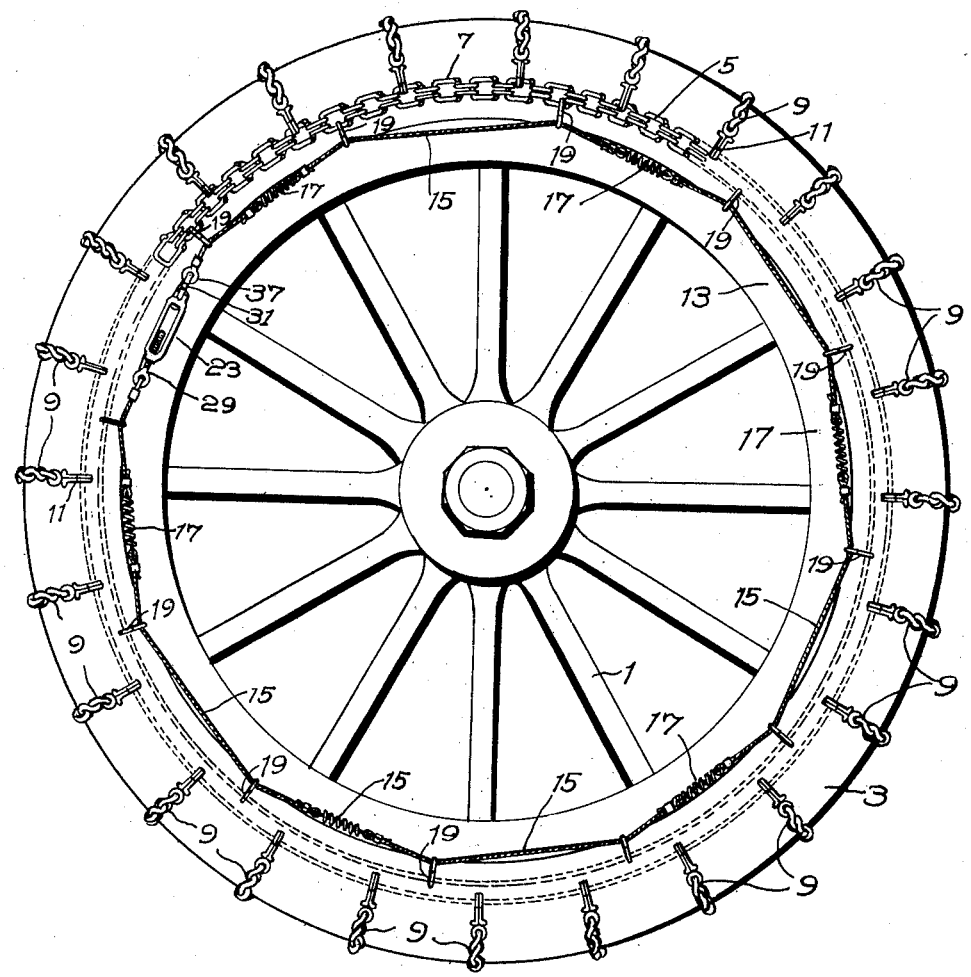
Figure 2:
Figure 3:
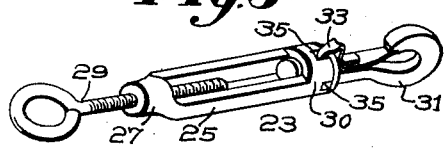

The character of the invention may be best understood by reference to the following description of one good form thereof shown in the accompanying drawing, wherein:

Fig. 1 is a side view of a wheel having a tire equipped with a tire chain embodying the invention;

Fig. 2 on an enlarged scale is a detail of a portion of the tire chain tensioning device; and Fig. 3 is a detail to be referred to.

Referring to the drawing, 1 designates a wheel which may be provided with a usual tire 3. Any suitable form of tire chain may be provided, in the present instance, comprising circular side members desirably in the form of chains 5 having their terminals detachably connected by the usual securing devices. Cross chains 9 are connected to the opposed circular side chains at suitable intervals, in the present instance, by means of swivel hooks 11 which may be substantially the same as shown in Patent No. 1,327,013, granted to me January 6, 1920.

The means for tensioning the tire chain and causing the cross chains to lie snugly against the periphery of the tire, in the present instance, comprises side members 13 conveniently formed of sections 15 of wire or other suitable members having their ends connected to coil springs 17. In the present instance, each of the side members 13 is provided with six such coil springs, although it will be understood that the number thereof may be varied as required. Preferably each of these springs is of short length with few convolutions, thereby contributing to the stiffness thereof.

Suitable means may be provided to connect the side members 13 with the circular side chains of the tire chains. This means, in the present instance of the invention, comprises hooks 19 having eyes 21 through which the wire sections 15 are adapted to extend. It is desirable that the tensioning side members shall be connected to the circular side chains at frequent intervals, and in the present instance, a sufficient number of the hooks 19 are provided, so that hooks may be connected to a circular side chain at points between adjacent pairs of cross chains. In the present instance, the tire chain has twenty-four cross chains, and twelve hooks are provided for connecting the tensioning members with the circular side chains.

Preferably the side tension members have ends detachably and adjustably connected. For this purpose swivel turn-buckle devices 23 may be employed each similar to the device shown in my Patent No. 1,374,348, dated April 12, 1921. This device (Fig. 3) comprises a nut 25 having a boss 27 threaded to receive an eye screw 29, and having a boss 30 in which a snap hook 31 is swivelled and provided with a spring locking detent 33 adapted to engage any one of several indentations 35. The eye of the screw 29 may be permanently connected to one terminal of the side member and an eye 37 may be secured to the other terminal of the side member.

In use, the tire chain may be applied to the tire in the usual manner. Then the side tensioning devices are applied. To accomplish this, the hooks 19 may be connected to links of the circular side chains and the snap hooks 31 may be connected to the eyes 37. Thereupon the turn-buckle nuts 25 may be rotated to tighten the side members and place the springs 17 thereof under the tension desired. As a result, the tensioning members will tend constantly to draw the circular side chains inward, and thereby hold the cross chains snugly against the tire. The tensioning of the side members causes them to assume polygonal form. Since the hooks are connected to the side chains at a multiplicity of points, the inward pull of the side tensioning members is desirably distributed to the circular side chains, and all of the cross chains are drawn inward and held in snug relation with the tire. The wire sections of the side tensioning members are free to slide through the hook eyes, and thus the coil springs 17 will act throughout the extent of the side tensioning members and pull substantially equally on all of the hooks, thereby pulling all of the cross chains into snug relation with the tire with substantially equal force. Thus, the cross chains are uniformly held in contact with the tire without possibility of localized excessive pull on certain of the cross chains.

The tensioning devices may not only be quickly and easily applied to the tire chain to hold the cross chains in intimate relation with the tire, but the tension devices may also be quickly and easily disconnected from the circular side chains when it is desired to remove the tire chain from the tire. Under some conditions it may suffice to apply the tensioning device to merely one of the circular side chains of the tire chain.

It will be understood that the invention is not limited to the specific embodiment shown, and that various deviations may be made therefrom without departing from the spirit and scope of the appended claims.

What is claimed is:—

1. A tensioning device for tire chains having side chains and cross chains, comprising a flexible member adapted for location within one of the side chains, and elements for connecting the flexible member at intervals with the side chain and so distributed that elements may be between pairs of cross chains, said elements being adapted to cause said member to assume a polygonal form, and said flexible member including coil springs distributed so that springs are between pairs of said connecting elements, that the springs when tensioned may operate through said elements and the side chain to draw all of the cross chains into snug relation with the tread of the tire.

2. A tensioning device for tire chains having side chains and cross chains, comprising a flexible member adapted for location within one of the side chains, and elements adapted for connecting the flexible member at intervals with the side chain, and for causing said member to assume a polygonal form, said flexible member including coil springs, and said connecting elements and coil springs being distributed with a frequency such that all of the cross chains may be drawn into snug relation with the tread of the tire when the coil springs are tensioned.

3. A tensioning device for tire chains having side chains and cross chains, comprising a flexible member adapted for location within one of the side chains, elements adapted for connecting the flexible member at intervals with the side chain and for causing said member to assume a polygonal form, said flexible member including coil springs, and means for tensioning said coil springs, said connecting elements and coil springs being distributed with a frequency such that all of the cross chains may be drawn into snug relation with the tread of the tire.

4. A tensioning device for tire chains having side chains and cross chains, comprising a flexible member including coil springs, a swivel turn-buckle connected to the ends of said member and adjustable to tension the coil springs, and elements for connecting the flexible member with one of the side chains and for causing said member to assume a polygonal form, said connecting elements and coil springs being distributed with a frequency such that all of the cross chains may be drawn into snug relation with the tread of the tire when the springs are tensioned.

5. A tensioning device for tire chains having side chains and cross chains, comprising a flexible member including sections 15, coil springs 17, hooks 19 having eyes through which the sections 15 extend, and a device 23 for tensioning the springs, said hooks being adapted for connection with one of the side chains and to cause the member to assume a polygonal form within the side chain, said hooks and springs being distributed with a frequency such that all of the cross chains may be drawn into snug relation with the tread of the tire when said springs are tensioned.

In testimony whereof, I have signed my name to this specification.

CHARLES S. BARRELL.